United States Patent
Kobayashi et al.

(10) Patent No.: US 6,679,214 B2
(45) Date of Patent: Jan. 20, 2004

(54) CONTROL SYSTEM AND METHOD FOR AUTOMATICALLY STOPPING AND STARTING VEHICLE ENGINE

(75) Inventors: Makoto Kobayashi, Wako (JP); Toshiaki Ichitani, Wako (JP); Toru Kitamura, Wako (JP); Takeshi Suzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 185 days.

(21) Appl. No.: 10/036,383

(22) Filed: Jan. 7, 2002

(65) Prior Publication Data

US 2002/0096137 A1 Jul. 25, 2002

(30) Foreign Application Priority Data

Jan. 19, 2001 (JP) ........................................ 2001-011714

(51) Int. Cl.[7] ............................................... F02N 17/00
(52) U.S. Cl. ..................................... 123/179.4; 701/112
(58) Field of Search .......................... 123/179.1, 179.3, 123/179.4, 434, 435; 701/112

(56) References Cited

U.S. PATENT DOCUMENTS

| | | | | |
|---|---|---|---|---|
| 5,239,824 A | * | 8/1993 | Matsumoto | 60/283 |
| 5,427,075 A | * | 6/1995 | Yamanaka et al. | 123/520 |
| 5,441,031 A | * | 8/1995 | Kiyomiya et al. | 123/520 |
| 5,477,842 A | * | 12/1995 | Maruyama et al. | 123/690 |
| 5,497,754 A | * | 3/1996 | Ito | 123/520 |
| 5,679,890 A | * | 10/1997 | Shinohara et al. | 73/118.1 |
| 5,732,687 A | * | 3/1998 | Hashimoto et al. | 123/520 |
| RE36,600 E | * | 3/2000 | Ito | 123/520 |
| 6,276,343 B1 | * | 8/2001 | Kawamura et al. | 123/520 |
| 6,276,344 B1 | * | 8/2001 | Isobe et al. | 123/520 |

FOREIGN PATENT DOCUMENTS

| | | |
|---|---|---|
| DE | 43 16 728 A1 | 3/1994 |
| EP | 1 036 694 A2 | 9/2000 |
| JP | 08-232777 | 9/1996 |
| JP | 10-281019 | 10/1998 |
| JP | 10-299582 | 11/1998 |
| JP | 10-299583 | 11/1998 |
| JP | 2000-257462 | 9/2000 |
| JP | 2000-282969 | 10/2000 |

\* cited by examiner

*Primary Examiner*—John Kwon
(74) *Attorney, Agent, or Firm*—Arent Fox Kintner Plotkin & Kahn (57) ABSTRACT

A control system for automatically stopping and starting the vehicle's engine is disclosed, which performs the automatic engine-stop and start control while the negative pressure of the fuel tank is maintained at a suitable level. The system comprises a canister for absorbing evaporating fuel generated in the fuel tank and purging the absorbed evaporating fuel into an air intake system of the engine; a pressure control section for controlling the inner pressure of the fuel tank in a manner such that the internal pressure is maintained at a predetermined level lower than the atmospheric pressure at least while the engine is operated; and an engine stop/start determining section for stopping or starting the vehicle according to the driving state of the vehicle, wherein the engine stop/start determining section determines to prohibit an engine stopping operation when the internal pressure of the fuel tank is higher than the predetermined level.

10 Claims, 6 Drawing Sheets

CONTROL SYSTEM AND METHOD FOR AUTOMATICALLY STOPPING AND STARTING VEHICLE ENGINE

BACKGROUND OF THE INVENTION

1. Field of the Invention

The present invention relates to a control system and method for automatically stopping and starting the engine of a vehicle, and in particular, to systems and methods for prohibiting the engine from being automatically stopped when the pressure in the fuel tank exceeds a predetermined pressure which is lower than atmospheric pressure.

2. Description of the Related Art

Conventionally, a control system for automatically stopping and starting the engine of a vehicle is known, in which the engine is automatically stopped when specific engine-stop conditions are satisfied, so as to reduce fuel consumption, and in which the engine is restarted under specific engine-restart conditions.

For example, Japanese Unexamined Patent Application, First Publication No. 2000-257462 discloses a hybrid vehicle, in which when the vehicle is driven at a low speed by selecting the D mode (i.e., drive mode) by using the select lever, the engine is automatically stopped if the vehicle is stopped while the driver is depressing the brake pedal. However, such automatic stop control is prohibited (i) during the warming up of the vehicle, (ii) during the operation of the air conditioner, (iii) when the electric load is large, or the like. In addition, the engine is restarted when the brake-master-power negative pressure reaches a specific pressure close to atmospheric pressure.

On the other hand, recently, various measures for preventing air pollution due to evaporating fuel have been proposed. For example, Japanese Unexamined Patent Application, First Publication No. Hei 10-299582 discloses a "negative-pressure and closed fuel tank" system for preventing the evaporating fuel, generated in the fuel tank, from being discharged to the atmosphere. In this system, the fuel tank is connected via a canister to an air intake passage of the internal combustion engine and the pressure inside the fuel tank is maintained at a suitable negative pressure.

However, in the negative-pressure and closed fuel tank system, the pressure of the fuel tank is set to a specific level by using the negative pressure of the manifold at the intake side. Therefore, if such a negative-pressure and closed fuel tank system is applied to a vehicle having the control system for automatically stopping and starting the engine, then after the specific conditions are satisfied and the engine is stopped, the inner pressure of the fuel tank may be lower than a target level for a long time or may not reach the target level.

In order to solve this problem, the capacity of the canister must be increased so as to improve the absorbing capability of the evaporating fuel during the engine stop. Consequently, the weight of the vehicle also increases, and the flexibility in the arrangement of functional components in the vicinity of the canister is degraded.

SUMMARY OF THE INVENTION

In consideration of the above circumstances, an object of the present invention is to provide a control system and method for automatically stopping and starting the engine of a vehicle, so as to perform the automatic engine-stop and start control while the negative pressure of the fuel tank is maintained at a suitable level.

Therefore, the present invention provides a control system for automatically stopping and starting an engine (e.g., an engine E in an embodiment explained below) of a vehicle, comprising:

a fuel tank (e.g., a fuel tank 19 in the embodiment explained below) in which evaporating fuel is generated;

a canister (e.g., a canister 33 in the embodiment explained below) for absorbing the evaporating fuel generated in the fuel tank and purging the absorbed evaporating fuel into an air intake system of the engine;

a pressure control section (e.g., a tank pressure control valve 30 and an evaporating fuel passage 20 in the embodiment explained below) for controlling the inner pressure of the fuel tank in a manner such that the internal pressure is maintained at a predetermined level at least while the engine is operated, wherein said predetermined level is lower than the atmospheric pressure; and an engine stop/start determining section (e.g., an engine ECU 1 in the embodiment explained below) for stopping or starting the vehicle according to the driving state of the vehicle, wherein the engine stop/start determining section determines to prohibit an engine stopping operation when the internal pressure of the fuel tank is higher than the predetermined level.

According to this structure, when the internal pressure of the fuel tank is higher than the predetermined level, the engine stop/start determining section determines to prohibit the engine stopping operation, so that the internal pressure of the fuel tank can be quickly reduced to the predetermined level which is lower than the atmospheric pressure. Therefore, it is possible to reliably prevent the evaporating fuel in the fuel tank from being discharged to the atmosphere (i.e., outside air).

The engine stop/start determining section controls stopping or starting of the vehicle according to the driving state of the vehicle. Therefore, the engine is stopped under specific conditions, for example, when (i) the starting operation using the motor is possible (e.g., in the determination of step S106 in the embodiment, the value of a motor start permission determination flag F_MOTSTB is 1), (ii) the SOC of the battery (corresponding to the remaining battery charge) is not within an over discharge range (e.g., in the determination of step S107 in the embodiment, the value of an energy storage zone determination flag F_ESZONE is 0), and (iii) the engine water temperature is equal to or above a predetermined temperature (e.g., in the determination of step S108 in the embodiment, the engine water temperature TW is equal to or above a lower limit water temperature TWFCMG).

Typically, the engine stopping operation includes fuel cut during deceleration. The fuel cut during deceleration is terminated under specific conditions. When the conditions for stopping the engine are satisfied (e.g., the value of an engine stopping control execution flag F_FCMG is 1 in the embodiment explained below), the fuel cut is continued. Due to the continuation of the fuel cut, the engine load may be low and it may be difficult to maintain the negative pressure of the fuel tank at a suitable level. In this case, a suitable negative pressure of the fuel tank can be obtained by restarting the engine.

Typically, when the engine is being stopped due to the determination of the engine stop/start determining section, the engine stop/start determining section determines to start the engine if the internal pressure of the fuel tank exceeds the predetermined level.

Accordingly, when the engine is being stopped by the control system for automatically stopping and starting the engine, the engine stop/start determining section determines to start the engine if the internal pressure of the fuel tank exceeds the predetermined level. Therefore, the internal pressure of the fuel tank can be quickly reduced to the predetermined level which is lower than the atmospheric pressure. Therefore, it is possible to reliably prevent the evaporating fuel in the fuel tank from being discharged to the atmosphere.

The control system for automatically stopping and starting the engine may further comprise:

a section for detecting an amount of evaporating fuel absorbed into the canister, wherein:

the engine stop/start determining section determines to prohibit an engine stopping operation when the detected amount of evaporating fuel absorbed into the canister is equal to or above a predetermined level. Accordingly, the purging operation of the evaporating fuel from the canister to the engine is continued so that the concentration of the evaporating fuel in the canister can be reduced and the internal pressure of the fuel tank can be maintained at the predetermined level lower than the atmospheric pressure. Therefore, it is possible to reliably prevent the evaporating fuel, which cannot be absorbed into the canister, from being discharged to the atmosphere.

The present invention also provides a control method of automatically stopping and starting an engine of a vehicle which has a canister for absorbing evaporating fuel generated in a fuel tank and purging the absorbed evaporating fuel into an air intake system of the engine, the control method comprising:

a pressure control step of controlling the inner pressure of the fuel tank in a manner such that the internal pressure is maintained at a predetermined level at least while the engine is operated, wherein said predetermined level is lower than the atmospheric pressure; and an engine stop/start determining step of stopping or starting the vehicle according to the driving state of the vehicle, wherein the engine stop/start determining step includes determining to prohibit an engine stopping operation when the internal pressure of the fuel tank is higher than the predetermined level.

DESCRIPTION OF THE PREFERRED EMBODIMENTS

Hereinafter, an embodiment of the present invention, which is applied to a hybrid vehicle, will be explained with reference to the drawings.

Figure 1:
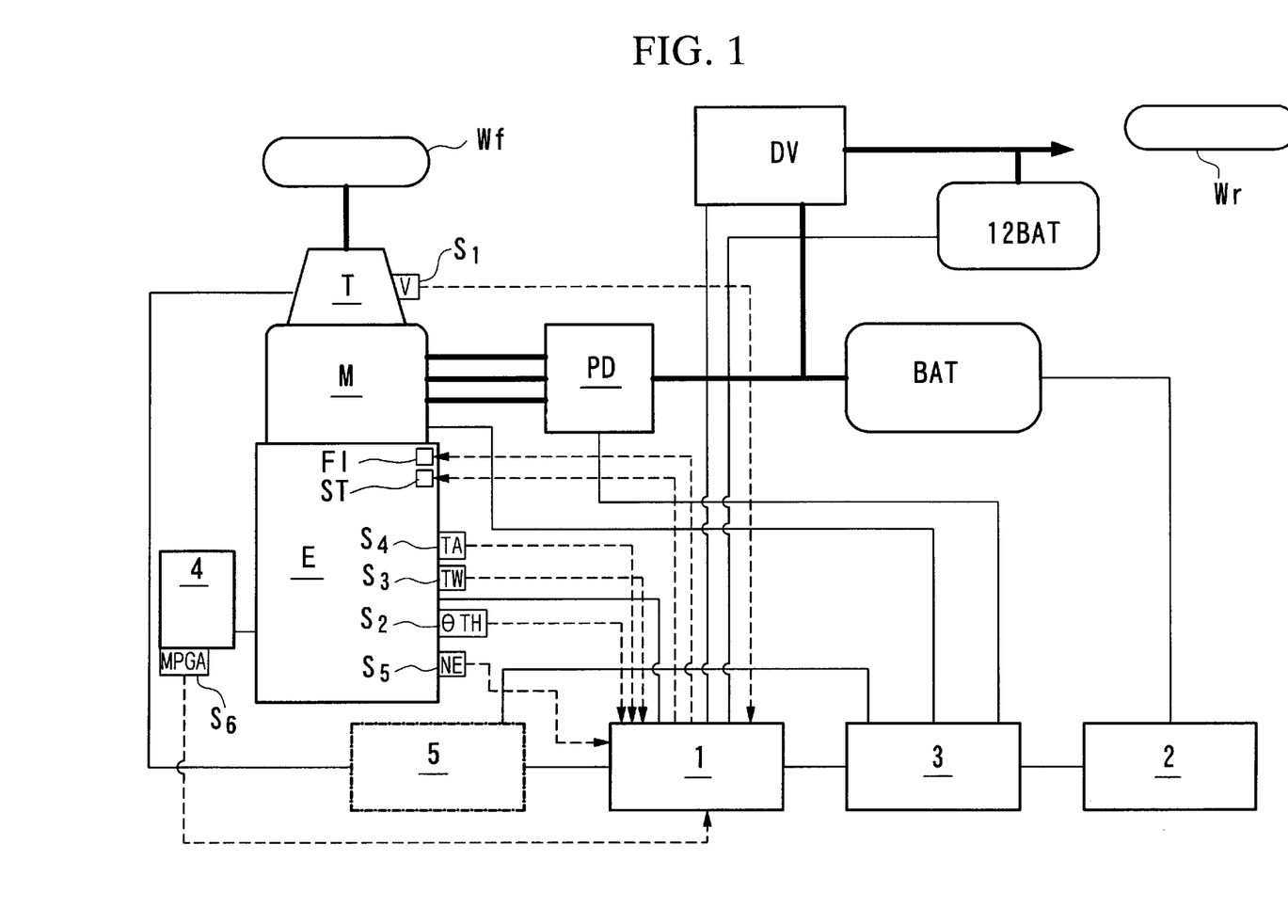
FIG. 1 is a diagram showing the general structure of an embodiment according to the present invention.

FIG. 1 is a block diagram illustrating the general structure of a parallel hybrid vehicle, more concretely, a hybrid vehicle which employs a manual transmission or CVT (continuously variable transmission).

In the figure, the driving force generated by both an engine E and an electric motor M is transmitted via automatic or manual transmission T to the driving wheels (here, front wheels) Wf. At the time of the deceleration of the hybrid vehicle, the driving force is transmitted from the driving wheels Wf to the electric motor M, the electric motor M functions as a generator for generating what is termed regenerative braking force, that is, the kinetic energy of the vehicle body is recovered and stored as electric energy. In FIG. 1, reference symbol Wr indicates rear wheels.

The driving of the motor M and the regenerating operation of the motor M are controlled by a power drive unit PD according to control commands from a motor ECU 3. A high voltage battery BAT for sending and receiving electric energy to and from the motor M is connected to the power drive unit PD. The battery BAT includes a plurality of modules connected in series, and in each module, a plurality of cells are connected in series. The hybrid vehicle includes a 12-V auxiliary battery "12BAT" for driving various accessories (or auxiliary devices). The auxiliary battery "12BAT" is connected to the battery BAT via a DC-DC converter (called "downverter") DV. The DC—DC converter DV, controlled by an engine ECU 1 (corresponding to the engine stop/start determining section of the present invention), reduces the voltage from the battery BAT so as to charge the auxiliary battery "12BAT".

Reference numeral 2 indicates a battery ECU for calculating the state of charge (corresponding to the remaining battery charge) SOC of the battery BAT. Reference numeral 4 indicates a brake negative-pressure system, and the portion surrounded by the alternating long-and-short dashed line in FIG. 1 is CVTECU 5.

The engine ECU 1 controls, in addition to the motor ECU 3 and the DC—DC converter DV, a fuel supply amount control section FI for controlling the amount of fuel supplied to the engine E, a starter motor ST, ignition timing, and so on.

Therefore, the engine ECU 1 receives SOC data from the battery ECU 2, motor data from the motor ECU 3, and signals from various sensors and switches.

The employed sensors are a vehicle speed (V) sensor $S_1$, a throttle opening-degree ($\theta$TH) sensor $S_2$, an engine water temperature (TW) sensor $S_3$, an engine intake air temperature (TA) sensor $S_4$, an engine (rotational) speed (NE) sensor $S_5$, and a brake negative pressure (MPGA) sensor $S_6$ for detecting the brake-master-power negative pressure. The functions of these sensors will be explained detail below.

The employed switches (not shown) are an ignition switch, a reverse switch, a brake switch, a neutral switch, and a clutch switch.

The control of the fuel cut, engine start, and the like are performed based on signals from the sensors and switches, the SOC data, and the motor data, which are input into the engine ECU 1. If the vehicle employs the CVT, the provided switches are an N (neutral) position switch, a P (parking) position switch, and an R (reverse) position switch, which are provided in place of the above-explained neutral switch and the reverse switch.

Figure 2:
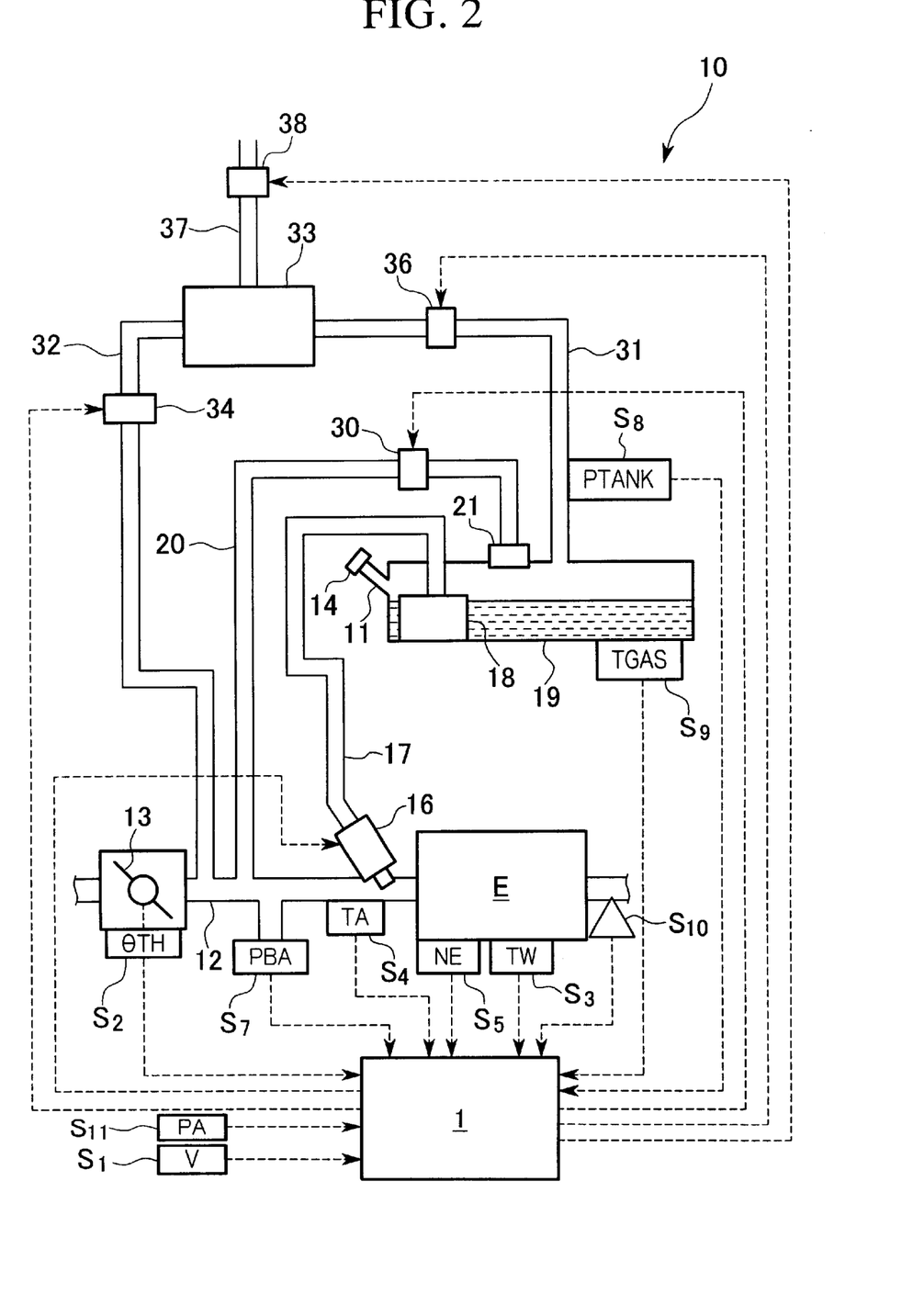
FIG. 2 is a diagram showing the general structure of a negative-pressure and closed fuel tank system in the embodiment.

Below, a negative-pressure and closed fuel tank system 10 in the present embodiment will be explained with reference to FIG. 2.

In the figure, in the middle of an air intake passage 2 for engine E (e.g., a four cylinder engine), a throttle valve 13 is attached. The throttle opening-degree (θTH) sensor $S_2$ is coupled with the throttle valve 13, and the sensor $S_2$ outputs an electric signal corresponding to the degree of opening of the throttle valve 13 to the engine ECU 1.

A fuel injection valve 16, a major constituent of the fuel supply amount control section FI, is provided for each cylinder, and an air intake valve (not shown) is provided in the middle of an air intake pipe 12 between the engine E and throttle valve 13, where the fuel injection valve 16 is positioned at the upstream side of the air intake valve. Each fuel injection valve 16 is connected via a fuel supply passage 17 to a fuel pump unit 18, where the fuel pump unit 18 is provided in a fuel tank 19 having a closed structure. The fuel pump unit 18 includes a fuel pump, a fuel strainer, and a pressure regulator in which the atmospheric pressure or the pressure in the tank is used as a reference pressure. These elements are integrated in the fuel pump unit 18. The fuel tank 19 has an oil port 11 for fueling, and a filler cap 14 is attached to the oil port 11.

Each fuel injection valve 16 is electrically connected to the engine ECU 1. The opening and closing timing of each fuel injection valve 16 is thus controlled using a control signal output from the engine ECU 1.

At the downstream side of the throttle valve 13, an air intake passage absolute pressure sensor $S_7$ for detecting the absolute pressure in the air intake passage (PBA) and the engine intake air temperature sensor $S_4$ for detecting the temperature of the intake air (TA) are provided. In the fuel tank 19, a tank inner-pressure (PTANK) sensor $S_8$ for detecting the inner pressure of the fuel tank (PTANK), and a fuel temperature (TGAS) sensor $S_9$ for detecting the temperature of the fuel in the fuel tank 19 (TGAS) are provided.

The engine speed sensor $S_5$ is provided in the vicinity of a camshaft (not shown) or a crankshaft (not shown) of the engine E.

An oxygen content sensor $S_{10}$ (called "LAF (lean air fuel) sensor", hereinbelow) for detecting the concentration of oxygen in the exhaust gas from the engine E and an atmospheric pressure (PA) sensor $S_{11}$ for detecting the atmospheric pressure PA are also provided, and the signal output from each sensor is sent to the engine ECU 1. The LAF sensor $S_{10}$ functions as a wide-area air-fuel ratio sensor which outputs a signal almost proportional to the oxygen content in the exhaust gas (corresponding to the air-fuel ratio of the mixture gas supplied to the engine E).

Below, the structure for setting the inner pressure of the fuel tank 19 to be negative will be explained.

Each fuel tank 19, provided for each cylinder, is connected via an evaporating fuel passage 20 to the air intake passage 12 at the downstream side of the throttle valve 13. A tank pressure control valve 30 for opening and closing the evaporating fuel passage 20 is provided in the middle of the evaporating fuel passage 20, so as to control the inner pressure of the fuel tank 19. The tank pressure control valve 30 is an electromagnetic valve for controlling the flow rate of the supplied evaporating fuel, which is generated in the fuel tank 19, by changing the ON/OFF duty ratio of a control signal for the valve, where the ON/OFF duty ratio corresponds to the degree of opening of the control valve. The operation of the tank pressure control valve 30 is controlled by the engine ECU 1. That is, the present embodiment has a pressure control section in which the pressure in the fuel tank 19 is maintained at a predetermined level lower than atmospheric pressure by using the evaporating fuel passage 20 and the tank pressure control valve 30, at least during the operation of the engine. The tank pressure control valve 30 may be a linear-control electromagnetic valve by which the degree of opening of the valve can be continuously changed.

A cut-off valve 21 is provided at the connection point of the evaporating fuel passage 20 and the fuel tank 19. The cut-off valve 21 is a float valve which is closed when the fuel tank 19 is full, or when inclination of the fuel tank 19 is increased.

Below, the structure for preventing the evaporating fuel (which is generated in the fuel tank 19) from being discharged to the atmosphere will be explained. A canister 33 is connected via a charge passage 33 to the fuel tank 19, and the canister 33 is connected via a purge passage 32 to the air intake passage 12 at the downstream side of the throttle valve 13. The evaporating fuel generated in the fuel tank 19 is absorbed into the canister 33, and simultaneously, the evaporating fuel is purged to an air intake system for the engine E.

In the middle of the charge passage 31, a charge control valve 36 is provided. The operation of the charge control valve 36 is controlled by the engine ECU 1, so that the valve is opened only during the fueling, thereby introducing the evaporating fuel in the fuel tank into the canister 33 during the fueling.

The canister 33 contains activated carbon for absorbing the evaporating fuel from the fuel tank 19, and the canister can communicate with the atmosphere via an atmosphere passage 37. A vent shut valve 38 is provided in the middle of the atmosphere passage 37, and the operation of the vent shut valve 38 is controlled by the engine ECU 1. According to the control, the vent shut valve 38 is opened only during the fueling or purging (that is, the vent-shut valve is a normally-closed valve). A purge control valve 34 is attached to the purge passage 32, between the canister 33 and the air intake passage 12. The purge control valve 34 is an electromagnetic valve which can continuously control the relevant flow rate by changing the ON/OFF duty ratio of the control signal for the valve (i.e., the degree of opening of the control valve). The operation of the purge control valve 34 is controlled by the engine ECU 1.

The engine ECU 1 has an input circuit for (i) shaping the waveform of the signal input from each sensor or the like, (ii) modifying the voltage level of the input signal to a predetermined level, (iii) converting an analog signal value to a digital signal value, and the like. The engine ECU 1 also includes a central processing unit (CPU), a storage section for storing operation programs executed by the CPU and results of each operation, and an output circuit for supplying driving signals to the fuel injection valve 16, the tank pressure control valve 30, the purge control valve 34, the charge control valve 36, and the vent shut valve 38.

The CPU of the engine ECU 1 controls the amount of fuel supplied to the engine E according to the signals output from the various sensors such as the engine speed sensor $S_5$, the air intake passage absolute pressure sensor $S_7$, the engine water temperature sensor $S_3$, and the like. The CPU of the engine ECU 1 also controls the operation of the electromagnetic valves according to the state during fueling or normal operation of the engine E. The general operation will be explained below.

During fueling, the charge control valve 36 and the vent shut valve 38 are opened, as explained above. Accordingly, the evaporating fuel generated in the fuel tank 19 during the fueling is absorbed into the canister 33 via the charge control valve 36, so that the air from which the fuel component was removed is discharged to the atmosphere via the vent shut valve 38. Therefore, it is possible to prevent the evaporating fuel, which is generated during fueling, from being discharged to the atmosphere.

Next, during the normal operation of the engine E, the charge control valve 36 is closed while the vent shut valve 38 is opened, and simultaneously, the purge control valve 34 is opened, so that the negative pressure of the air intake passage 12 acts on the canister 33. Accordingly, the atmosphere is drawn via the vent shut valve 38 into the canister 33, so that the fuel which has been absorbed into the canister 33 is purged via the purge control valve 34 to the air intake passage 12. Therefore, the evaporating fuel generated in the fuel tank 19 is supplied to the air intake passage 12 without being discharged to the atmosphere, and the supplied fuel is combusted in a combustion chamber.

In addition, during the normal operation of the engine E, the tank pressure control valve 30 is opened when predetermined conditions are satisfied, and the control for making the negative pressure is performed in a manner such that owing to the negative pressure in the air intake passage 12, the internal pressure PTANK of the fuel tank 19 reaches a target pressure P0 which is lower than the atmospheric pressure. In this case, the target pressure P0 is determined in consideration of an estimated increase of the internal pressure PTANK of the fuel tank 19, so as to maintain the negative pressure even after the engine E is stopped. An example of such setting is disclosed in Japanese Unexamined Patent Application, First Publication No. Hei 10-281019. In addition, the target pressure P0 is set as an absolute pressure and may be set so as to satisfy the condition that the differential pressure between the internal pressure of the fuel tank and the atmospheric pressure has a specific value (for example, approximately 40 to 47 kPa (corresponding to 300 to 350 mmHg)).

Below, the method of evaluating the amount of fuel absorbed into the canister, that is, the concentration of the evaporating fuel in the canister, will be explained.

Generally, while the supply of the evaporating fuel from the canister 33 is continued, feedback control for the air-fuel ratio is executed based on the output from the LAF sensor $S_{10}$. According to the feedback control, the air-fuel ratio of the mixture gas in the combustion chamber is equal to the logical air-fuel ratio. Based on a target amount of fuel injected from the fuel injection valve 16 during the above feedback control, the concentration of the evaporating fuel in the canister 33 is evaluated.

More specifically, the concentration of the evaporating fuel supplied from the canister 33 is calculated based on the difference between the amount of fuel injected from the fuel injection valve 16 in the purge-on state (in which the purge control valve 34 is opened) and the amount of fuel injected from the fuel injection valve 16 in the purge-off state (in which the purge control valve 34 is closed), or based on values corresponding to these amounts of injected fuel. Based on the calculated concentration, the concentration of the evaporating fuel of the canister 33, that is, the amount of absorbed evaporating fuel, is evaluated.

Determination of Motor Operation Mode

Figure 3:
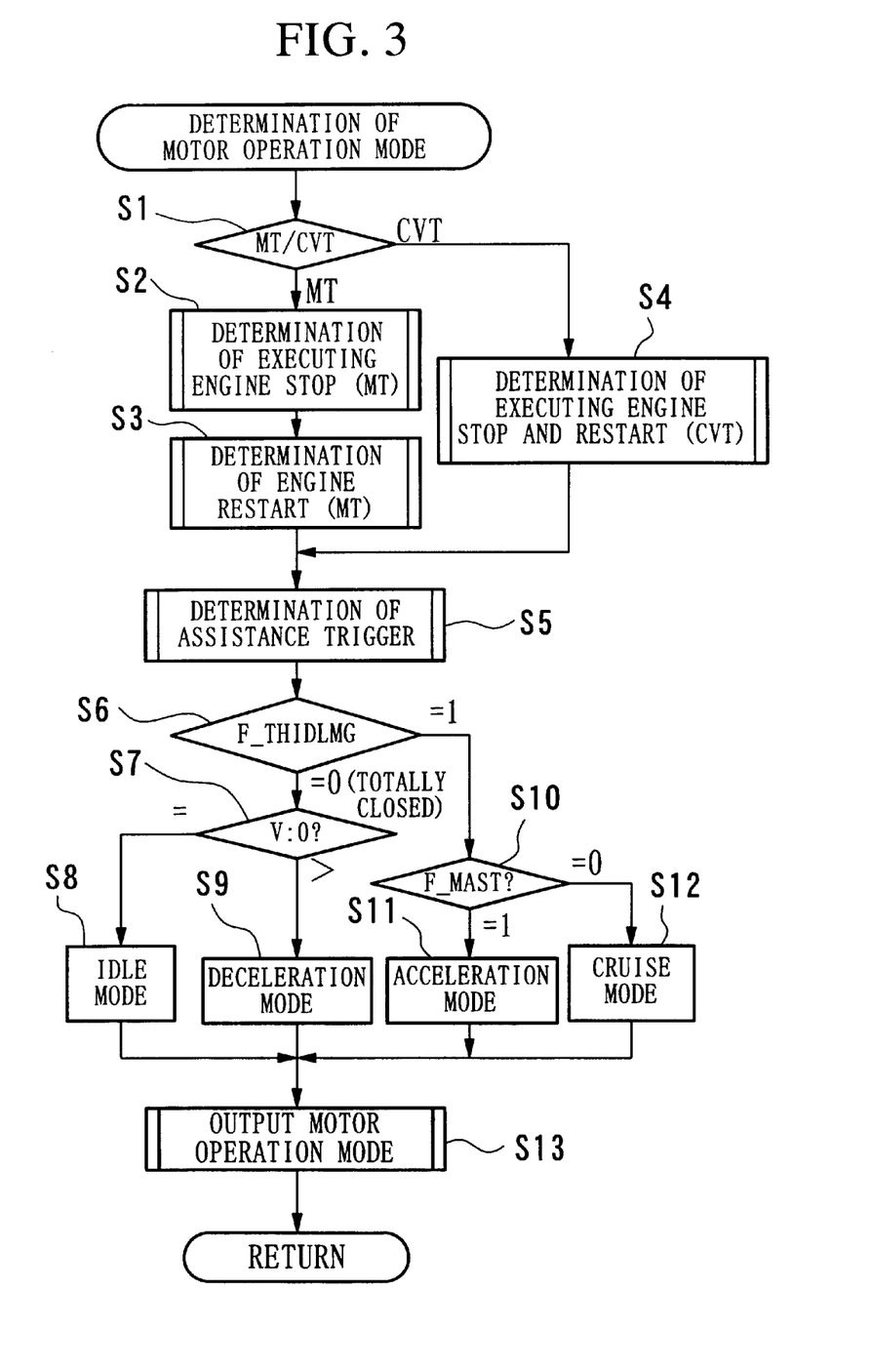
FIG. 3 is a flowchart showing the determination of the motor operation mode in the embodiment.

Below, the modes of controlling the motor of the hybrid vehicle in the present embodiment will be explained with reference to the flowchart in FIG. 3.

In the first step S1, it is determined which the present vehicle employs manual transmission (MT) or continuously variable transmission (CVT). If it is determined that the present vehicle is an MT vehicle, then in the next step S2, determination (for MT vehicle) of executing the engine stopping operation (explained below) is executed, and in the next step S3, determination of restarting the engine is executed. The operation then proceeds to step S5.

On the other hand, if it is determined in step S1 that the present vehicle is a CVT vehicle, then in step S4, determination of executing the engine stopping and restarting operation (explained below) is executed, and the operation proceeds to step S5.

In step S5, it is determined whether the power assisting operation using the motor is executed (i.e., determination of assistance trigger). The assistance trigger may be determined using parameters such as the degree of opening of the throttle or the vehicle speed. In the next step S6, it is determined whether the throttle valve is totally closed, by referring to a throttle total-close determination flag F_THIDLMG.

If it is determined that the value of the throttle total-close determination flag F_THIDLMG is 0, that is, the throttle valve is totally closed, and if it is determined in the next step S7 that the vehicle speed is 0, that is, the vehicle is currently stopped, then in step S8, the "idle" mode is selected so that the engine E is maintained to perform idle driving.

If it is determined in step 6 that the value of the throttle total-close determination flag F_THIDLMG is 0, that is, the throttle valve is totally closed, and if it is determined in the next step S7 that the vehicle speed is not 0, then in step S9, the deceleration mode is selected so that regenerative braking using the motor M is performed. In addition, the battery BAT is charged by regenerated energy.

If it is determined in step 6 that the value of the throttle total-close determination flag F_THIDLMG is 1, that is, the throttle valve is open, then the operation proceeds to step S10, where a motor assistance determination flag F_MAST is referred to, so as to determine which is the current mode, the acceleration mode or the cruise mode.

If it is determined in step 10 that the value of the motor assistance determination flag F_MAST is 1 (i.e., it is determined in the above step S5 (for the determination of the assistance trigger) that the assistance using the motor M is necessary), then the acceleration mode is selected in step S11, so that the driving force of the engine E is assisted by using the driving force of motor M.

If it is determined in step 10 that the value of the motor assistance determination flag F_MAST is 0, then the cruise mode is selected in step S12, so that the motor M is not driven and the vehicle is driven using the driving force of engine E.

Accordingly, a signal indicating the motor operation as selected above is output in step S13, and the above steps are again performed.

Below, the step of the determination of executing engine stop (MT), the step of the determination of engine restart (MT), and the step of the determination of executing engine stop and restart (CVT), included in the flowchart of FIG. 3, will be respectively explained.

Determination of Executing Engine Stop (MT)

Figure 4:
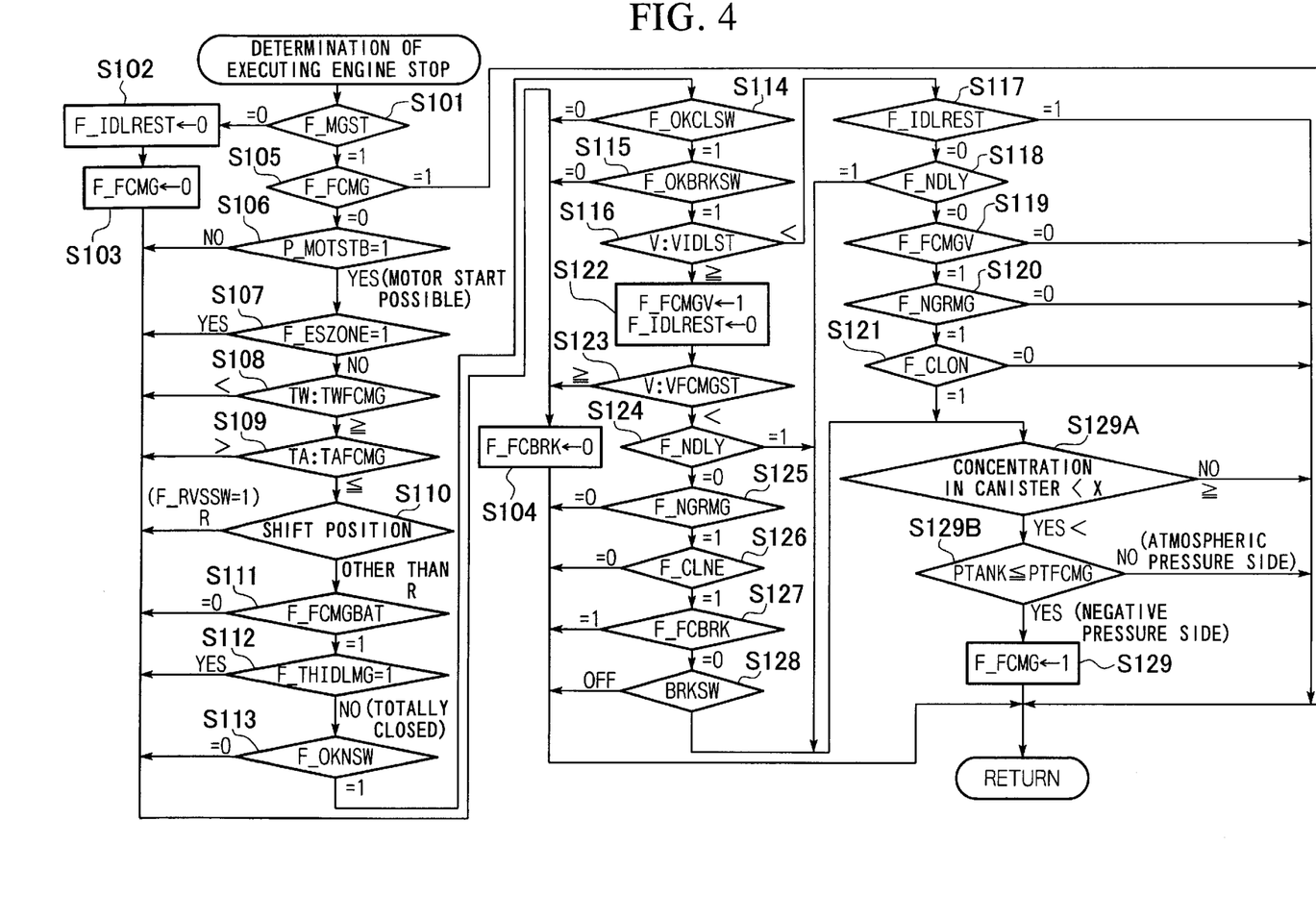
FIG. 4 is a flowchart showing the determination of executing the engine stopping operation, applied to an MT vehicle, in the embodiment.

First, the determination of executing the engine stopping operation, applied to the MT vehicle, will be explained. Basically, the engine stopping operation is permitted only when the restarting using the motor is possible, and more specifically, the permission of execution is determined according to the state of the engine, the driving state, and the driver's operation.

FIG. 4 is a flowchart showing the determination of executing the engine stopping operation, applied to the MT vehicle, in the present embodiment. In the first step S101, the value of a "start switch ON and starting execution" flag F_MGST is determined. If it is determined that the value of the start switch ON and starting execution flag F_MGST is 0, that is, if it is determined that the vehicle is being initially driven, then (i) the value of a restarting execution flag F_IDLREST is set to 0 in step S102 (here, the restarting operation is performed due to the open state of the throttle valve), (ii) the value of an engine stopping control execution flag F_FCMG is set to 0 in step S103, and (iii) the value of a flag F_DCBRK is set to 0, where the flag F_DCBRK indicates the state that the brake was switched off during the fuel cut in the deceleration state. The operation is then returned to the main routine shown in FIG. 3. That is, the above-explained flags are initialized according to the operation from the ignition ON (i.e., the ignition is set on) to the start switch ON (i.e., the start switch is switched on) at the initial driving.

More specifically, the "initial driving" is a driving state which is started by the initial and manual engine-start operation performed by the driver, that is, in this state, the automatic engine stopping and restarting operation has not yet been executed.

Conversely, if it is determined in step S101 that the "start switch ON and starting execution" flag F_MGST is 1, that is, the initial driving of the vehicle was ended and the vehicle was restarted, then in step S105, the value of an engine stopping control execution flag F_FCMG is determined, so as to separate the conditions for executing the engine stop and the conditions for restarting the engine after the engine stop. Therefore, if it is determined that the value of the engine stopping control execution flag F_FCMG is 1, then the remaining steps are skipped and the operation returns to the main flow of FIG. 3.

If it is determined that the value of the engine stopping control execution flag F_FCMG is 0, then in the next step S106, it is determined whether the value of a motor start permission determination flag F_MOTSTB is 1, that is, whether the starting operation using the motor is possible. More specifically, this possibility is determined by referring to the signal output from the motor ECU 3. If it is determined that the value of the motor start permission determination flag F_MOTSTB is 0, then it is determined that the starting operation using the motor is impossible and the operation proceeds to step S104. Conversely, if it is determined that the value of the motor start permission determination flag F_MOTSTB is 1, then the operation proceeds to step S107. Therefore, when the starting using the motor is impossible, the engine stopping operation is not executed.

In step S107, it is determined whether an energy storage zone determination flag F_ESZONE is 1, that is, whether the SOC of the battery (corresponding to the remaining battery charge) is within an over discharge range (e.g., 20% or less). Accordingly, the engine stopping operation is not executed when the remaining battery charge is small.

If it is determined that the value of the energy storage zone determination flag F_ESZONE is 1, that is, it is determined that the SOC of the battery is within the over discharge range, then the operation proceeds to step S104. Conversely, if it is determined that the value of the energy storage zone determination flag F_ESZONE is 0, that is, it is determined that the SOC of the battery is not within the over discharge range, then the operation proceeds to step S108, where the (engine) water temperature TW is compared with a lower limit water temperature TWFCMG (e.g., 40° C.) which is used for determining the engine stopping operation.

If it is determined that the water temperature TW is lower than the lower limit water temperature TWFCMG, then the operation proceeds to step S104. Accordingly, the engine stopping operation is not executed until the warming up has been completed. Therefore, if it is determined that the water temperature TW is equal to or above the lower limit water temperature TWFCMG (which is referred to for executing the engine stopping operation), then in step S109, the intake air temperature TA is compared with an upper limit intake air temperature TAFCMG (e.g., 40° C.).

If it is determined that the intake air temperature TA is higher than the upper limit intake air temperature TAFCMG which is referred to for determining the engine stopping operation, then the operation proceeds to step S104. Accordingly, when the intake air temperature is high, the engine stopping operation is not executed so as to avoid inferior starting performance and to maintain desired performance of the air conditioner. Therefore, if it is determined that the intake air temperature TA is equal to or less than the upper limit intake air temperature TAFCMG for executing the engine stopping operation, then the operation proceeds to step S110.

In step S110, it is determined whether the current shift position is "R" (i.e., reverse position). If the value of a reverse switch flag F_RVSSW is 1, that is, if it is determined that the shift position is R, the operation proceeds to step S104. Accordingly, the engine stopping operation is not executed while the vehicle is started and stopped at a low speed in the reverse position, thereby improving the operability of the vehicle. Conversely, if it is determined that the shift position is other than R, then in step S111, the state of a "12V large consumption and restarting determination" flag F_FCMGBAT is determined. If it is determined that the value of the "12V large consumption and restarting determination" flag F_FCMGBAT is 0, that is, it is determined that consumption of the 12V system is large and thus restarting is impossible, then the operation proceeds to step S104, so that the engine stopping operation is not executed. Conversely, if it is determined that the value of the "12V large consumption and restarting determination" flag F_FCMGBAT is 1, that is, it is determined that consumption of the 12V system is large but restarting is possible, then the operation proceeds to step S112.

In step S112, it is determined whether the value of the throttle total close determination flag F_THIDLMG is 1. If it is determined that the value of the throttle total close determination flag F_THIDLMG is 1, that is, the throttle valve is not totally closed, then the operation proceeds to step S104, so that the engine stopping operation is not executed. Conversely, if it is determined that the value of the throttle total close determination flag F_THIDLMG is 0, that is, the throttle valve is totally closed, then the operation proceeds to step S113.

In step S113, the state of a neutral switch OK flag F_OKNSW is determined. In the next step S1 14, the state of a clutch switch OK flag F_OKCLSW is determined, and in the next step S115, the state of a brake switch OK flag F_OKBRKSW is determined.

In each of these steps S113, S114, and S115, it is determined whether the relevant switch operates normally. If the switch operates normally and has not failed, the corresponding flag has a value of 1. If it is determined that the three switches operate normally, the operation proceeds to step S116, while if any switch fails or the normal operating state of any switch cannot be confirmed, and thus the corresponding flag has a value of 0, then the operation proceeds to step S104.

In step S116, the vehicle speed V is compared with an engine stop execution determination vehicle speed VIDLST for the low-speed state. For example, the engine stop execution determination vehicle speed VIDLST is 3 km/h. According to this comparison, the fuel cut is continued during the driving (see steps from S122) and the engine stopping operation is executed when the vehicle is stopped (see steps from S117). Therefore, fuel consumption can be improved.

If it is determined in step S116 that the vehicle speed V is smaller than the engine stop execution determination vehicle speed VIDLST, then in step S117, the state of a throttle-open restarting execution flag F_IDLREST is determined. If it is determined that the value of the throttle-open restarting execution flag F_IDLREST is 1, that is, the throttle valve has been open, then the operation returns to the main routine of FIG. 3. Accordingly, if the vehicle, in which the engine has been stopped, is restarted by switching the ignition on or making the throttle open, then the value of this flag F_IDLREST is set to 1, so that the engine stopping operation is not executed again until the vehicle is started.

Conversely, if it is determined that the value of the throttle-open restarting execution flag F_IDLREST is 0, then the operation proceeds to step S118. In step S118, the state of a neutral duration determination flag F_NDLY is determined. If it is determined that the value of the neutral duration determination flag F_NDLY is 1, that is, the neutral state has been maintained for a predetermined time, then the operation proceeds to step S129A. Conversely, if it is determined that the value of the neutral duration determination flag F_NDLY is 0, then the operation proceeds to step S119, where the state of a flag F_FCMGV is determined. This flag F_FCMGV is provided for determining whether the vehicle speed has exceeded a predetermined speed after the starter was activated. This condition "after the starter was activated" means "after the vehicle was restarted" (a similar definition applies in the following explanations).

If it is determined that the value of the above flag F_FCMGV is 0, then the operation is returned to the main flow, while if it is determined that the value of the flag F_FCMGV is 1, then the operation proceeds to step S120. In step S120, the state of a flag F_NGRMG is determined. This flag F_NGRMG is provided for determining whether a gear other than the first gear was used. If it is determined that the value of this flag F_NGRMG is 0, that is, the vehicle is driving in the first gear or has been stopped after the driving in the first gear, then the engine stopping operation is not executed because a mode such as "immediate start after temporary stop" is possible. Therefore, the operation is returned to the main flow in this case.

Conversely, if it is determined that the value of the flag F_NGRMG for determining whether a gear other than the first gear was used is 1, then in step S121, the state of a clutch depression continuation determination flag F_CLON is determined. If it is determined that the value of the clutch depression continuation determination flag F_CLON is 0, then the operation returns to the main flow. Conversely, if it is determined that the value of the clutch depression continuation determination flag F_CLON is 1, then the operation proceeds to step S129A.

In step S129A, it is determined whether the concentration of the evaporating fuel in the canister 33 is less than a predetermined value X. If the result of the determination is "NO", then the operation returns to the main flow. Conversely, if the result of the determination is "YES", the operation proceeds to step S129B.

If the operation of stopping the engine E is executed while the concentration of the evaporating fuel in the canister is equal to or above the predetermined value X, the evaporating fuel in the fuel tank 19 generated under this condition cannot be absorbed. Therefore, it is necessary to prohibit the engine stopping operation, continue the purging, and reduce the concentration of the evaporating fuel in the canister 33. Here, the predetermined value X indicates the amount of absorption, which is calculated by the above-explained concentration evaluation for the evaporating fuel of the canister 33.

In step S129B, it is determined whether the internal pressure PTANK of the fuel tank 19 is equal to or less than a predetermined value PTFCMG (i.e., the negative pressure side). If the result of the determination is "NO" (i.e., the atmospheric pressure side), then the operation returns to the main routine. Conversely, if the result of the determination is "YES" (i.e., the negative pressure side), then the operation proceeds to step S129. If the engine stopping operation is executed while the internal pressure PTANK is larger than the predetermined value PTFCMG, then the internal pressure is further increased due to the evaporating fuel which is generated in the fuel tank 19 under this condition; thus, finally, the negative pressure state cannot be maintained. Therefore, the engine stopping operation is prohibited in this case. Preferably, the predetermined value PTFCMG is a value which is slightly higher than the above-explained target pressure P0 and which belongs to the atmospheric pressure side. For example, the predetermined value PTFCMG is 33 kPa (=250 mmHg).

In step S129, the value of the engine stopping control execution flag F_FCMG is set to 1, and then the operation returns to the main routine. Accordingly, the engine stopping operation is executed if the vehicle is stopped while the clutch pedal is depressed in a gear position other than the first gear and the reverse gear, without changing the gear position.

In step S116, the vehicle speed V is compared with the engine stop execution determination vehicle speed VIDLST for the low-speed state. If it is determined that the vehicle speed V is equal to or above the engine stop execution determining vehicle speed VIDLST, then in step S122, the value of the flag F_FCMGV (for determining whether the vehicle speed has exceeded a predetermined speed after the starter was activated) is set to 1, and the value of the restarting execution flag F_IDLREST (i.e., execution due to the throttle open) is set to 0. The operation then proceeds to step S123.

In step S123, the vehicle speed V is compared with an upper limit vehicle speed VFCMGST (e.g., 20 km/h). This upper limit vehicle speed VFCMGST is provided for continuing the fuel cut during deceleration. If it is determined that the vehicle speed V is equal to or above the upper limit vehicle speed VFCMGST, then the operation proceeds to step S104. Conversely, if it is determined that the vehicle speed V is smaller than the upper limit vehicle speed VFCMGST, then the operation proceeds to step S124, where the state of the neutral duration determination flag F_NDLY is determined.

If it is determined in step S124 that the value of the neutral duration determination flag F_NDLY is 1, then the operation proceeds to step S129A. Conversely, if it is determined that the value of the neutral duration determination flag F_NDLY is 0, then the operation proceeds to step S125.

In step S125, the state of the flag F_NGRMG (which is provided for determining whether a gear other than the first gear was used) is determined. If it is determined that the value of the flag F_NGRMG is 0, then the operation returns to the main routine, while if it is determined that the value of the flag F_NGRMG is 1, then in step S126, the state of a flag F_CLNE is determined. This flag F_CLNE is provided for determining whether the engine speed NE, when the clutch is being depressed, is larger than a predetermined value (e.g., 700 rpm).

If the engine speed NE (when the clutch is being depressed) is larger than the predetermined value, then it is determined that the value of the flag F_CLNE is 0. In this case, the operation returns to the main routine. Conversely, if it is determined that the value of the flag F_CLNE is 1, that is, when the clutch is depressed at an engine speed lower than the predetermined engine speed NE, the fuel cut during deceleration is continued, and then in step S127, it is determined whether the state of a flag F_FCBRK is determined. This flag F_FCBRK is provided for determining whether the brake has been switched off while the fuel cut during the deceleration is continued.

If it is determined that the value of the flag F_FCBRK is 1, then the operation returns to the main routine. Conversely, if it is determined that the value of the flag F_FCBRK is 0, then in step S128, the state of the brake switch is determined. If it is determined that the brake switch is off, then the operation returns to the main routine. If it is determined that the brake switch is on, the operation proceeds to step S129A.

Determination of Engine Restart (MT)

Figure 5:
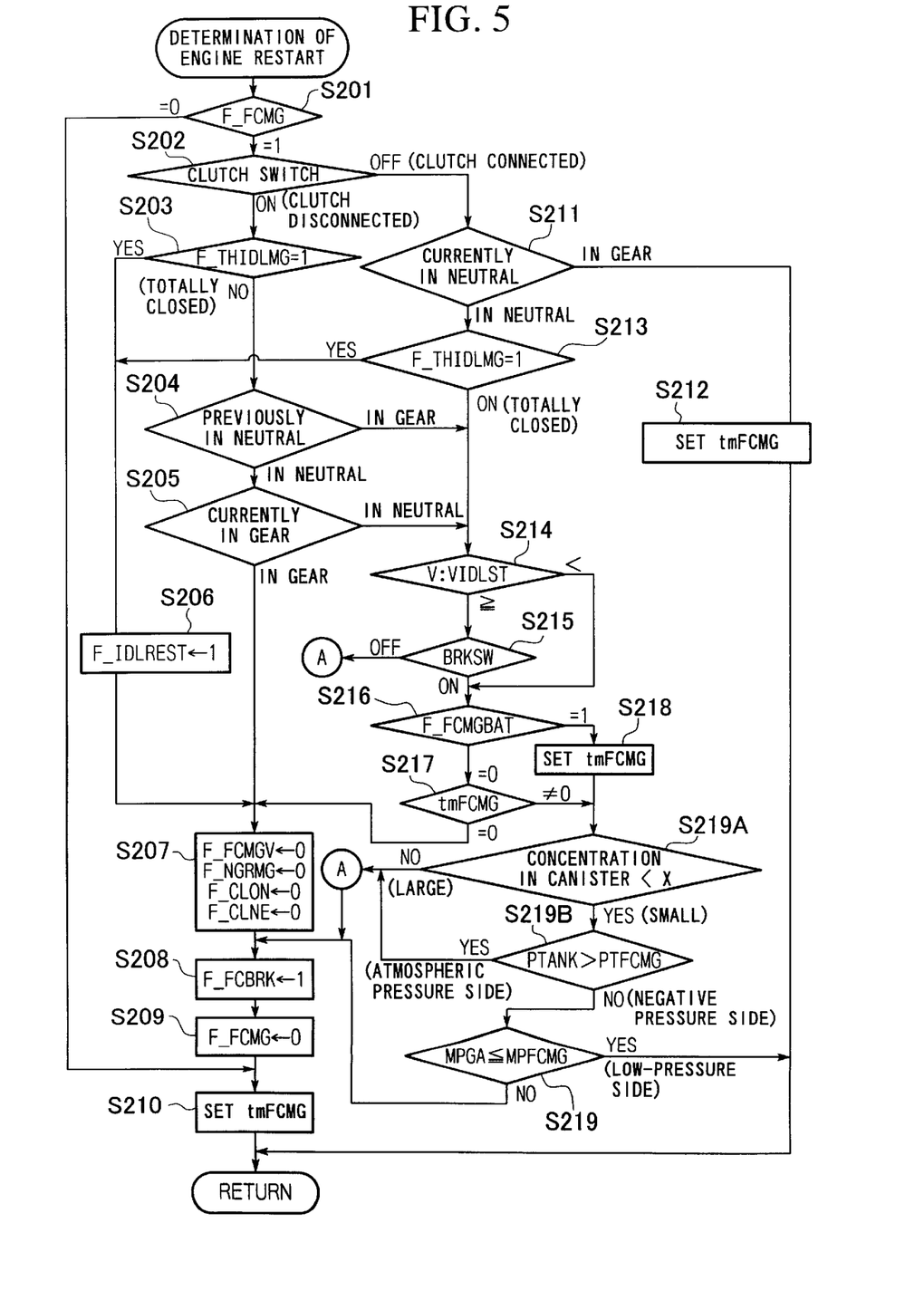
FIG. 5 is a flowchart showing the operation of determining the restart of an MT vehicle.

FIG. 5 is a flowchart showing the operation of determining the restart of an MT vehicle.

In the first step S201, the state of the engine stopping control execution flag F_FCMG is determined. If it is determined that the value of the engine stopping control execution flag F_FCMG is 0, the remaining steps (except for step S210) in this flow are skipped because the determination of the restarting operation is executed while the engine is stopped and the fuel cut is continued. In step S210, a delay timer tmFCMG, which is provided for prohibiting the restarting when the SOC of the battery is below a lower limit, is set.

If it is determined that the value of the engine stopping control execution flag F_FCMG is 1, then in step S202, it is determined which state the clutch switch is in, on or off.

If it is determined that the clutch switch is on, that is, the clutch is disconnected, then in step S203, it is determined whether the value of the throttle total-close determination flag F_THIDLMG is 1.

If it is determined that the value of the throttle total-close determination flag F_THIDLMG is 1, that is, the throttle valve is not totally closed, then the operation proceeds to step S206, where the engine restart or the termination of the fuel cut due to the throttle open is performed, and the value of the restarting execution flag F_IDLREST is set to 1. According to the setting of the flag F_IDLREST, the engine stopping operation and the continuation of the fuel cut are not executed again.

In step S207, the values of (i) the flag F_FCMGV for determining whether the vehicle speed has exceeded a predetermined speed after the starter was activated, (ii) the flag F_NGRMG for determining whether a gear other than the first gear was used, (iii) the clutch depression continuation determination flag F_CLON, and (iv) the flag F_CLNE for determining whether the engine speed NE (detected when the clutch is depressed) is larger than a predetermined value, are set to 0. In the following step S208, the value of the flag F_FCBRK, which is provided for determining whether the brake has been switched off while the fuel cut during the deceleration is continued, is set to 1. In the next step S209, the value of the engine stopping control execution flag F_FCMG is set to 0, and the operation proceeds to step S210 and then returns to the main routine. Accordingly, the engine stopping operation and the continuation of the fuel cut are not executed again except when the neutral position is again selected.

If it is determined in step S203 that the throttle total-close determination flag F_THIDLMG is 0, that is, the throttle valve is totally closed, then in step S204, it is determined whether the previous gear position is in neutral. If it is determined that the previous gear position is in neutral, then in the next step S205, it is determined whether the current state is in the in-gear state. If it is determined that the current state is in the in-gear state, then the operation proceeds to step S207 and the engine restarting operation or the termination of the fuel cut is executed.

If it is determined in step S204 that the previous state is in the in-gear state and it is determined in step S205 that the current gear is in neutral, then the operation proceeds to step S214.

If it is determined in step S202 that the clutch switch is off, that is, the clutch is connected, then in step S211, it is determined whether the current gear position is in neutral. If it is determined in step S211 that the current state is in-gear state, then in step S212, the delay timer tmFCMG, which is provided for prohibiting the restarting when the SOC of the battery goes below a lower limit, is set, and then the operation returns to the main routine. If it is determined in step S211 that the current gear position is in neutral, then in step S213, it is determined whether the throttle total-close determination flag F_THIDLMG is 1.

If it is determined that the value of the throttle total-close determination flag F_THIDLMG is 1, then the operation proceeds to step S206. Therefore, if it is determined in the previous step S211 that the gear is in neutral and it is determined in step S213 that the throttle pedal has been depressed, then the engine is restarted or the fuel cut is terminated (i.e., returning from the fuel-cut state). If it is determined that the throttle total-close determination flag F_THIDLMG is not 1, that is, the throttle valve is totally closed, then the operation proceeds to step S214.

In step S214, it is determined whether the vehicle speed V is compared with the engine stop execution determination vehicle speed VIDLST for the low-speed state. If it is determined that the vehicle speed V is lower than the engine stop execution determination vehicle speed VIDLST, then the operation proceeds to step S216. Conversely, if it is determined that the vehicle speed V is equal to or above the engine stop execution determination vehicle speed VIDLST, then in step S215, it is determined which state the brake switch is in, on or off. If it is determined that the brake switch is off, the operation proceeds to step S208. Therefore, the fuel cut is terminated if the brake is switched off while the fuel cut is continued during the driving (i.e., running) of the vehicle. Conversely, if it is determined that the brake switch is on, then the operation proceeds to step S216.

In step S216, the state of the flag F_FCMGBAT for determining the restarting due to the decrease of the remaining charge of the battery is determined. If it is determined that the value of the flag F_FCMGBAT is 0, that is, it is determined that the remaining battery charge has decreased and the restarting is necessary, then the operation proceeds to step S217.

If it is determined in step S216 that the value of the flag F_FCMGBAT is 1, that is, the restarting is unnecessary, then in step S218, the delay timer tmFCMG (provided for prohibiting the restarting when the SOC of the battery goes below a lower limit) is set, and then the operation proceeds to step S219A.

Here, the same flag F_FCMGBAT referred to in the determination of executing the engine stop (refer to step S111) is referred to. This means that the threshold related to the remaining charge of the battery for determining the engine stop is the same as that for determining the engine restart. However, the threshold for determining the engine stop may be higher than that for determining the engine restart, so as to obtain superior engine-starting performance from the engine-stop state.

In step S219A, it is determined whether the concentration of the evaporating fuel in the canister is smaller than a predetermined value X. If the result of the determination is "NO", then the operation proceeds to step S208. Conversely, if the result of the determination is "YES", then the operation proceeds to step S219B.

When the concentration of the evaporating fuel in the canister is equal to or above the predetermined value X, it is necessary to restart the engine so as to decrease the concentration of the evaporating fuel in the canister.

In step S219B, it is determined whether the internal pressure PTANK of the fuel tank is larger than the predetermined value PTFCMG (i.e., the atmospheric pressure side). If the result of the determination is "YES" (i.e., the atmospheric pressure side), then the operation proceeds to step S208. Conversely, if the result of the determination is "NO" (i.e., the negative pressure side), then the operation proceeds to step S219. This is because when the internal pressure PTANK of the fuel tank enters the atmospheric pressure side which is larger than the predetermined value PTFCMG, it is necessary to immediately restart the engine and obtain negative pressure so as to prevent further increase of the internal pressure PTANK of the fuel tank.

In step S217, the state of the delay timer tmFCMG, which is provided for prohibiting the restarting when the SOC of the battery is below a lower limit, is determined. If it is determined that the value of the delay timer tmFCMG is 0, then the operation proceeds to step S207. Conversely, if it is determined that the value of the delay timer tmFCMG is not 0, then the operation proceeds to step S219A.

In step S219, a brake master power negative pressure MPGA is compared with an engine-stop executing brake-master-power upper-limit negative pressure MPFCMG (e.g., −57 kPa (=−430 mmHg)). As a preferable example, the engine-stop executing brake-master-power upper-limit negative pressure MPFCMG is (i) −62 kPa (=−465 mmHg) while the vehicle is stopped, and (ii) −72 kPa (=−540 mmHg) while the vehicle is driving, and thus the negative pressure can be easily maintained.

If it is determined in step S219 that the brake master power negative pressure MPGA is equal to or less than the engine-stop executing brake-master-power upper-limit negative pressure MPFCMG (i.e., "YES"), that is, the brake master power negative pressure MPGA belongs to the low-pressure side, then sufficient negative pressure is maintained and thus the engine is not restarted and the operation returns to the main routine.

Conversely, if it is determined in step S219 that the brake master power negative pressure MPGA is larger than the engine-stop executing brake-master-power upper-limit negative pressure MPFCMG (i.e., "NO"), that is, the brake master power negative pressure MPGA belongs to the atmospheric pressure side, then the operation proceeds to step S208 and the engine is restarted.

As explained above, the determination related to the brake master power negative pressure MPGA (see step S219) is executed after the determination related to the internal pressure PTANK of the fuel tank (see step S219B). That is, if necessary internal pressure PTANK of the fuel tank is maintained, then it is determined whether necessary brake master power negative pressure MPGA is maintained. Accordingly, maintenance of necessary brake master power negative pressure MPGA has higher priority so as to maintain the safety. Here, if the result of the determination of step S219B is "YES", the determination of step S219 is not executed. This is because necessary brake-master-power negative pressure can be obtained if the engine is restarted due to the result "YES" of the determination in step S219B.

Therefore, during the engine stop or the continuation of the fuel cut, if the concentration of the evaporating fuel in the canister 33 exceeds the predetermined value X, or if the internal pressure PTANK of the fuel tank exceeds the predetermined value PTFCMG, then the engine E is restarted or the fuel cut is terminated so as to prevent the evaporating fuel from being discharged to the atmosphere. Therefore, a desirable concentration of the evaporating fuel in the canister 33 and a desirable negative pressure in the fuel tank can be obtained. Consequently, the engine can be automatically stopped and restarted while the fuel consumption is improved and discharge of the evaporating fuel to the atmosphere is reliably prevented.

Determination of Executing Engine Stop and Restart (CVT)

Figure 6:
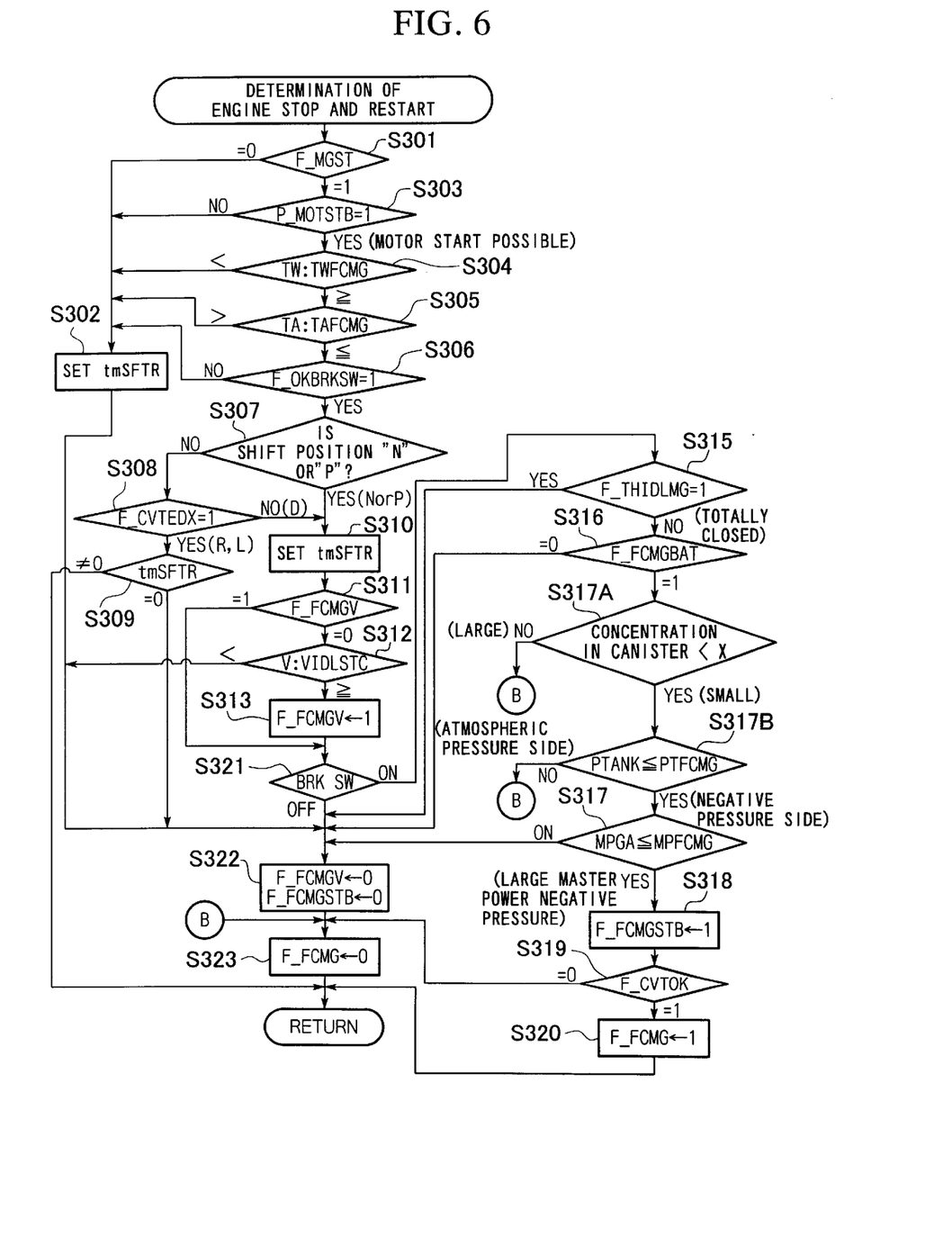
FIG. 6 is a flowchart showing the determination of executing the engine stop and restart of a vehicle which employs a CVT.

Below, the determination of executing the engine stop and restart of a vehicle which employs a CVT will be explained. FIG. 6 is a flowchart showing this operation.

In the first step S301 in FIG. 6, the state of the start switch ON and starting execution flag F_MGST is determined. If it is determined that the value of the flag F_MGST is 0 (i.e., the initial driving), then in step S302, a timer tmSFTR is set, where the timer tmSFTR is provided for waiting for a shift-range change to be settled. The operation then proceeds to step S322, where the values of (i) the flag F_FCMGV (provided for determining whether the vehicle speed has exceeded a predetermined speed after the starter was activated) and (ii) an engine stop execution request flag F_FCMGSTB for CVT are set to 0. In the next step S323, the value of the engine stopping control execution flag F_FCMG is set to 0, then the operation returns to the main routine.

Conversely, if it is determined in step S301 that the value of the start switch ON and starting execution flag F_MGST is 1, that is, the vehicle has been restarted (i.e., the vehicle is not in the initial driving mode), then in step S303, it is determined whether a parameter P_MOTSTB, which is a data communicated from the motor ECU 3, is 1. The value "1" of the parameter P_MOTSTB indicates that the engine start using the motor is possible, while the value "0" of the parameter P_MOTSTB indicates that the engine start using the motor is impossible.

If it is determined in step S303 that the value of the parameter P_MOTSTB is 1, then in the next step S304, the (engine) water temperature TW is compared with an engine stopping lower water temperature TWFCMG for executing the engine stopping operation. Conversely, if it is determined in step S303 that the value of the parameter P_MOTSTB is 0, the operation proceeds to step S302.

If it is determined in step S304 that the water temperature TW is lower than the engine stopping lower water temperature TWFCMG, then the operation proceeds to step S302. Accordingly, the engine stopping operation is not executed if the warming up has not been completed. Therefore, if it is determined that the water temperature TW is equal to or above the engine stopping lower water temperature TWFCMG, then in step S305, the intake air temperature TA is compared with an engine stopping upper intake air temperature TAFCMG.

If it is determined that the intake air temperature TA is larger than the engine stopping upper intake air temperature TAFCMG, then the operation proceeds to step S302. Accordingly, when the intake air temperature is high, the engine stopping operation is not executed so as to avoid inferior starting performance and to maintain desired performance of the air conditioner. Therefore, if it is determined that the intake air temperature TA is equal to or less than the engine stopping upper intake air temperature TAFCMG, then the operation proceeds to step S306.

In step S306, the state of the brake switch OK flag F_OKBRKSW is determined. This step is performed so as to determine whether the brake switch is operating normally. If the brake switch has not failed, the value of the brake switch OK flag F_OKBRKSW has been set to 1. Therefore, if it is determined that the brake switch is operating normally, then the operation proceeds to step S307, while if it is determined that the brake switch has failed and the flag value is 0, then the operation proceeds to step S302.

In step S307, it is determined whether the current shift position is N (neutral) or P (park). If it is determined that the shift position is a position other than N and P, then in step S308, the state of a drive range determination flag F_CVTEDX is determined. The value "0" of the drive range determination flag F_CVTEDX indicates that the shift position is in the D range, while the value "1" of the drive range determination flag F_CVTEDX indicates that the shift position is in the R range or the like.

Therefore, if it is determined in step S308 that the value of the drive range determination flag F_CVTEDX is 0, then the operation proceeds to step S310 so as to execute the engine stopping operation. Conversely, if it is determined that value of the drive range determination flag F_CVTEDX is 1, then in step S309, it is determined whether the value of the timer tmSFTR (provided for waiting for a shift-range change to be settled) is 0. If it is determined that the value of the timer tmSFTR is 0, then the operation proceeds to step S322, while if it is determined that the value of the timer tmSFTR is not 0, then the operation returns to the main routine.

Here, the timer tmSFTR is provided for preventing the release of the engine stop due to passing through the R range in a shifting operation between the D range and the P range. Such release of the engine stop causes decrease of the frequency of the execution of the engine stopping operation.

If it is determined in step S307 that the shift position is in the N or P range, then in step S310, the timer tmSFTR is set so as to execute the engine stopping operation.

In the next step S311, the state of the flag F_FCMGV (for determining whether the vehicle speed has exceeded a predetermined speed after the starter was activated) is determined.

If it is determined that the value of the flag F_FCMGV is 0, then the operation proceeds to step S312, where the vehicle speed V is compared with the engine stop execution determination vehicle speed VIDLST for the low-speed state (e.g., 15 km/h). If it is determined in step S311 that the value of the flag F_FCMGV is 1, then the operation proceeds to step S321.

If it is determined in step S312 that the vehicle speed V is smaller than the engine stop execution determination vehicle speed VIDLST for the low-speed state, then the operation proceeds to step S322. Conversely, if it is determined that the vehicle speed V is equal to or above the engine stop execution determination vehicle speed VIDLST, then in step S313, the value of the flag F_FCMGV (provided for determining whether the vehicle speed has exceeded a predetermined speed after the starter was activated) is set to 1. The operation then proceeds to step S321.

According to these steps S311, S312, and S313, the values of the flags, which were initialized due to the restart after the engine stop (see step S322), are not set to 1 until the vehicle speed V exceeds the engine stop execution determination vehicle speed VIDLST. That is, once the vehicle is restarted, the engine stopping operation is not executed until the vehicle speed V exceeds the engine stop execution determination vehicle speed VIDLST.

Similar to step S119 relating to the MT vehicle, once the vehicle is restarted, the engine stop is not executed until the vehicle has driven for a certain time (or certain distance) because the engine stopping operation and the restarting operation may be frequently repeated during a traffic jam or when the vehicle is temporarily stopped and restarted, or the like.

In step S321, the state of the brake switch is determined. If it is determined that the brake switch is on, then the operation proceeds to step S315, where the state of the throttle total-close determination flag F_THIDLMG is determined. If it is determined that the value of the throttle total-close determination flag F_THIDLMG is 1, that is, the throttle valve is not totally closed, then the operation proceeds to step S322. Therefore, the engine stopping operation is not executed in this case. Conversely, if it is determined that the value of the throttle total-close determination flag F_THIDLMG is 0, that is, the throttle valve is totally closed, then the operation proceeds to step S316, where the state of the flag F_FCMGBAT (for determining the restarting due to the decrease of the remaining charge of the battery) is determined.

If it is determined in step S316 that the value of the flag F_FCMGBAT is 0, that is, restarting due to decrease of the remaining battery charge is necessary, then the a operation proceeds to step S322. Conversely, if it is determined that the value of the flag F_FCMGBAT is 1, that is, restarting due to decrease of the remaining battery charge is unnecessary, then the operation proceeds to step S317A.

In step S317A, it is determined whether the concentration of the evaporating fuel in the canister is less than the predetermined value X. If the result of the determination is "NO", the operation proceeds to step S323, while if the result of the determination is "YES", the operation proceeds to step S317B. If the engine E is stopped while the concentration of the evaporating fuel in the canister 33 is equal to or above the predetermined value X, the evaporating fuel in the fuel tank generated under this condition cannot be absorbed. Therefore, the operation of stopping the engine E should be prohibited (or the engine E should be restarted if the engine E is being stopped) and the purging operation should be continued, so as to decrease the concentration of the evaporating fuel in the canister 33.

In step S317B, it is determined whether the internal pressure PTANK of the fuel tank is equal to or less than the predetermined value PTFCMG (i.e., the negative pressure side). If the result of the determination is "NO" (i.e., the atmospheric pressure side), then the operation proceeds to step S323, while if the result of the determination is "YES" (i.e., the negative pressure side), then the operation proceeds to step S317.

If the engine stopping operation is executed while the internal pressure PTANK of the fuel tank is higher than the predetermined value PTFCMG (i.e., the internal pressure belongs to the atmospheric pressure side), the internal pressure PTANK further increases due to the evaporating fuel generated in the fuel tank 19 under this condition; thus, the negative pressure state cannot be maintained. Therefore, in such a case, the engine stop is prohibited, or the engine is restarted if the engine is being stopped.

In step S317, the brake master power negative pressure MPGA is compared with the engine-stop executing brake-master-power upper-limit negative pressure MPFCMG. If it is determined in step S317 that the brake master power negative pressure MPGA is equal to or less than the engine-stop executing brake-master-power upper-limit negative pressure MPFCMG, that is, belongs to the low-pressure side (i.e., "YES"), then the operation proceeds to step S318 so as to execute the engine stopping operation. In this case, sufficient negative pressure has been obtained.

Conversely, if it is determined in step S317 that the brake master power negative pressure MPGA is larger than the engine-stop executing brake-master-power upper-limit negative pressure MPFCMG, that is, belongs to the atmospheric pressure side (i.e., "NO"), then the operation proceeds to step S322 so as to restart the engine and obtain necessary negative pressure.

Therefore, similar to the operation for the MT vehicle, if (i) the concentration of the evaporating fuel in the canister 33 exceeds the predetermined value X or (ii) the internal pressure PTANK of the fuel tank exceeds the predetermined value PTFCMG while the engine is stopped or the fuel cut is continued, then the engine E is restarted or the fuel cut is terminated so as to prevent the evaporating fuel from being discharged to the atmosphere. Therefore, the concentration of the evaporating fuel in the canister 33 can be at a suitable level and the internal pressure of the fuel tank can be at a suitable negative pressure. Consequently, it is possible to improve fuel consumption and reliably prevent evaporating fuel from being discharged to the atmosphere while the automatic engine stopping and restarting operation is executed.

In step S318, the value of the engine stop execution request flag F_FCMGSTB for CVT is set to 1, and in the next step S319, the state of a CVT engine stop OK flag F_CVTOK is determined. If it is determined that the value of the CVT engine stop OK flag F_CVTOK is 1, that is, it is determined that the engine stop is on standby, then in step S320, the value of the engine stopping control execution flag F_FCMG is set to 1, then the operation returns to the main routine. Conversely, if it is determined that the value of the CVT engine stop OK flag F_CVTOK is 0, that is, it is determined that the engine stop has not yet been on standby, then in step S323, the value of the engine stopping control execution flag F_FCMG is set to 0, then the operation returns to the main routine.

In the above step S321, the state of the brake switch is determined. If it is determined that the brake switch is off, then in step S322, the values of (i) the flag F_FCMGV provided for determining whether the vehicle speed has exceeded a predetermined speed after the starter was activated, and (ii) the engine stop execution request flag F_FCMGSTB, are set to 0. In the following step S323, the value of the engine stopping control execution flag F_FCMG is set to 0, then the operation returns to the main routine.

According to the present embodiment, the engine stopping and restarting operation can be executed while the concentration of the evaporating fuel in the canister 33 and the internal pressure of the fuel tank are maintained at a suitable level. Therefore, fuel consumption can be improved while the discharge of the evaporating fuel to the atmosphere can be reliably prevented.

The present invention is not limited to the above embodiment. For example, the present invention can be applied to normal vehicles rather than to hybrid vehicles. Additionally, in steps S129A, S219A, and S317A of the above embodiment, the concentration of the evaporating fuel in the canister is compared with a predetermined value. However, the amount of absorption itself, obtained by the concentration evaluation, may be compared with a reference amount of absorption. The evaluation of the concentration of the evaporating fuel in the canister may be performed using a fuel temperature sensor $S_9$ (see FIG. 2). Also in the above embodiment, the internal pressure PTANK of the fuel tank is compared with a predetermined pressure (PTFCMG). However, instead of such a predetermined pressure, a predetermined pressure range may be employed so that the engine stopping operation is permitted if the internal pressure is within the predetermined pressure range. In this case, the engine restart may be permitted so as to satisfy the condition that the engine stop is continued until the internal pressure enters the higher side (i.e., atmospheric pressure side) within the above pressure range and the engine is restarted when the internal pressure exceeds the maximum level (in the atmospheric pressure side) within the predetermined pressure range.

What is claimed is:

1. A control system for automatically stopping and starting an engine of a vehicle, comprising:
   a fuel tank in which evaporating fuel is generated;
   a canister for absorbing the evaporating fuel generated in the fuel tank and purging the absorbed evaporating fuel into an air intake system of the engine;
   a pressure control section for controlling the inner pressure of the fuel tank in a manner such that the internal pressure is maintained at a predetermined level at least while the engine is operated, wherein said predetermined level is lower than the atmospheric pressure; and
   an engine stop/start determining section for stopping or starting the vehicle according to the driving state of the vehicle, wherein the engine stop/start determining section determines to prohibit an engine stopping operation when the internal pressure of the fuel tank is higher than the predetermined level.

2. A control system as claimed in claim 1, wherein when the engine is being stopped due to the determination of the engine stop/start determining section, the engine stop/start determining section determines to start the engine if the internal pressure of the fuel tank exceeds the predetermined level.

3. A control system as claimed in claim 1, further comprising:
   a section for detecting an amount of evaporating fuel absorbed into the canister,
   wherein:
   the engine stop/start determining section determines to prohibit an engine stopping operation when the detected amount of evaporating fuel absorbed into the canister is equal to or above a predetermined level.

4. A control system as claimed in claim 2, further comprising:
   a section for detecting an amount of evaporating fuel absorbed into the canister,
   wherein:
   the engine stop/start determining section determines to prohibit an engine stopping operation when the detected amount of evaporating fuel absorbed into the canister is equal to or above a predetermined level.

5. A control system as claimed in claim 1, wherein the engine stopping operation includes fuel cut during deceleration.

6. A control method of automatically stopping and starting an engine of a vehicle which has a canister for absorbing evaporating fuel generated in a fuel tank and purging the absorbed evaporating fuel into an air intake system of the engine, the control method comprising:

a pressure control step of controlling the inner pressure of the fuel tank in a manner such that the internal pressure is maintained at a predetermined level at least while the engine is operated, wherein said predetermined level is lower than the atmospheric pressure; and an engine stop/start determining step of stopping or starting the vehicle according to the driving state of the vehicle, wherein the engine stop/start determining step includes determining to prohibit an engine stopping operation when the internal pressure of the fuel tank is higher than the predetermined level.

7. A control method as claimed in claim 6, wherein when the engine is being stopped due to the determination by the engine stop/start determining step, the engine stop/start determining step includes determining to start the engine if the internal pressure of the fuel tank exceeds the predetermined level.

8. A control method as claimed in claim 6, further comprising:

a step of detecting an amount of evaporating fuel absorbed into the canister, wherein:

the engine stop/start determining step includes determining to prohibit an engine stopping operation when the detected amount of evaporating fuel absorbed into the canister is equal to or above a predetermined level.

9. A control method as claimed in claim 7, further comprising:

a step of detecting an amount of evaporating fuel absorbed into the canister, wherein:

the engine stop/start determining step includes determining to prohibit an engine stopping operation when the detected amount of evaporating fuel absorbed into the canister is equal to or above a predetermined level.

10. A control method as claimed in claim 6, wherein the engine stopping operation includes fuel cut during deceleration.

* * * * *